United States Patent

Christensson et al.

[11] Patent Number: 5,520,970
[45] Date of Patent: May 28, 1996

[54] PACKAGING CONTAINER LAMINATE POSSESSING FAT RESISTANCE PROPERTIES

[75] Inventors: Ingmar Christensson, Lund; Bengt Carlsson, Bjärred, both of Sweden

[73] Assignee: Tetra Laval Holdings & Finance S.A., Pully, Switzerland

[21] Appl. No.: 229,308

[22] Filed: Apr. 18, 1994

[30] Foreign Application Priority Data

Apr. 22, 1993 [SE] Sweden .................................. 9301342

[51] Int. Cl.$^6$ .................................. B32B 1/00; B32B 15/18; B32B 27/08; B65D 6/00
[52] U.S. Cl. .................. 428/342; 428/35.3; 428/35.8; 428/35.9; 428/458; 428/461; 428/484; 428/487; 428/527; 428/530
[58] Field of Search .................................. 428/34.3, 35.3, 428/34.2, 35.7, 35.8, 35.9, 461, 500, 507, 508, 511, 457, 484, 487, 527, 530; 229/3.5 R, 3.5 MF

[56] References Cited

U.S. PATENT DOCUMENTS

| 4,590,126 | 5/1986 | Andersson | 428/349 |
| 5,057,359 | 10/1991 | Merdem et al. | 428/213 |
| 5,154,982 | 10/1992 | Cessna | 428/537.5 |

FOREIGN PATENT DOCUMENTS

484726A1  5/1992  European Pat. Off. .

*Primary Examiner*—Paul J. Thibodeau
*Assistant Examiner*—Stephen Sand
*Attorney, Agent, or Firm*—Burns, Doane, Swecker & Mathis

[57] ABSTRACT

A packaging laminate for a liquid-tight, configurationally stable packaging container possessing good fat resistance properties.

The packaging laminate (10) has a core layer (11) of paper or paperboard and outer liquid-tight films or coatings (12 and 13) of thermoplastic, preferably polyethylene.

Between the core layer (11) and the one outer thermoplastic film (12), there is a layer (14) of greaseproof paper which is bonded to the core layer (11) via an interjacent layer (15) of binder or sealant plastic in order to impart fat resistance to the packaging laminate.

Between the core layer (11) and the second outer thermoplastic film (13), there is an aluminium foil (16) which is bonded to the core layer (11) via an interjacent layer (17) of binder or sealant plastic, whereby the packaging laminate is given excellent oxygen gas barrier properties.

15 Claims, 1 Drawing Sheet

PACKAGING CONTAINER LAMINATE POSSESSING FAT RESISTANCE PROPERTIES

TECHNICAL FIELD

The present invention relates to a packaging laminate for a liquid-tight, configurationally stable packaging container possessing superior fat resistance properties, the packaging laminate including a rigid, but foldable core layer of paper or paperboard. Moreover, the present invention relates to such a packaging container produced from the packaging laminate and intended for edible oils.

BACKGROUND ART

Nowadays, liquid foods of the cooking oil, or edible oil type are mostly packed and transported in finished consumer packages of a single-use disposable nature. Edible oils constitute one group of particularly perishable foods which require good chemical, as well as mechanical properties of the packaging container in order to be able to be stored during a lengthy period of time with freshness qualities which are retained or insignificantly diminished. The packaging material in these so-called single use packages therefore most generally consists of a plurality of mutually laminated layers of material which together give the package its requisite product protection properties.

A prior art packaging laminate which is often employed in single-use packages for edible oils and similar perishable food products includes a core layer of paper or paperboard which imparts to the package mechanical strength and configurational stability, and outer layers of plastic, preferably polyethylene, which give the package the requisite tightness properties against liquids. Moreover, the outer layers of plastic make the packaging laminate heat-sealable or fusible in such a manner that mutually facing plastic layers can easily be sealed to one another by surface fusion, for the formation of mechanically strong, liquid-tight sealing joints or seams during the packaging production process. Moreover, such good product protection requires that the package is oxygen gas tight and fat resistant and, to achieve these additional protective properties, it has hitherto been common to modify, by chemical means, the paper or paperboard layer of the packaging laminate by impregnation with an organic fluorine compound which makes the packaging laminate fat resistant and almost impermeable to oxygen gas.

A packaging laminate which employs the above-described chemically modified paper or paperboard layer suffers from serious environmental drawbacks because of the organic fluorine compound which, for example on the incineration of used packages, can create toxic organic combustion products and which, on production of the modified paper or paperboard material, often requires organic solvents of types which are undesirable from the public health point of view.

SUMMARY OF THE INVENTION

One object of the present invention is, therefore, to realize a packaging laminate of the type described by way of introduction, without the consequential environmental and public health problems and drawbacks from which the prior art technology suffers;

Greaseproof paper is a paper quality which is produced in a conventional manner by high refining or extensive grinding of woodpulp fibres, which give the greaseproof paper excellent fat resistance properties, without demands for additives of chemical compounds of an environmentally hazardous nature. Consequently, the packaging laminate in its entirety consists substantially of naturally occurring materials and is, thus, a better packaging laminate in environmental terms than the described prior art packaging laminate, and at the same time it possesses good fat resistance properties.

A further object of the present invention is to devise a liquid-tight, configurationally stable packaging container possessing superior fat resistance properties, for particularly perishable liquid foods such as edible oils.

BRIEF DESCRIPTION OF THE DRAWING

The present invention will now be described and explained in greater detail hereinbelow, with particular reference to the accompanying FIG. 1 which schematically illustrates a cross section of a packaging laminate according to one preferred embodiment of the present invention. However, it should be observed that the illustrated embodiment merely serves to illustrate the present invention without restricting its scope.

DETAILED DESCRIPTION OF PREFERRED EMBODIMENT

Figure 1:
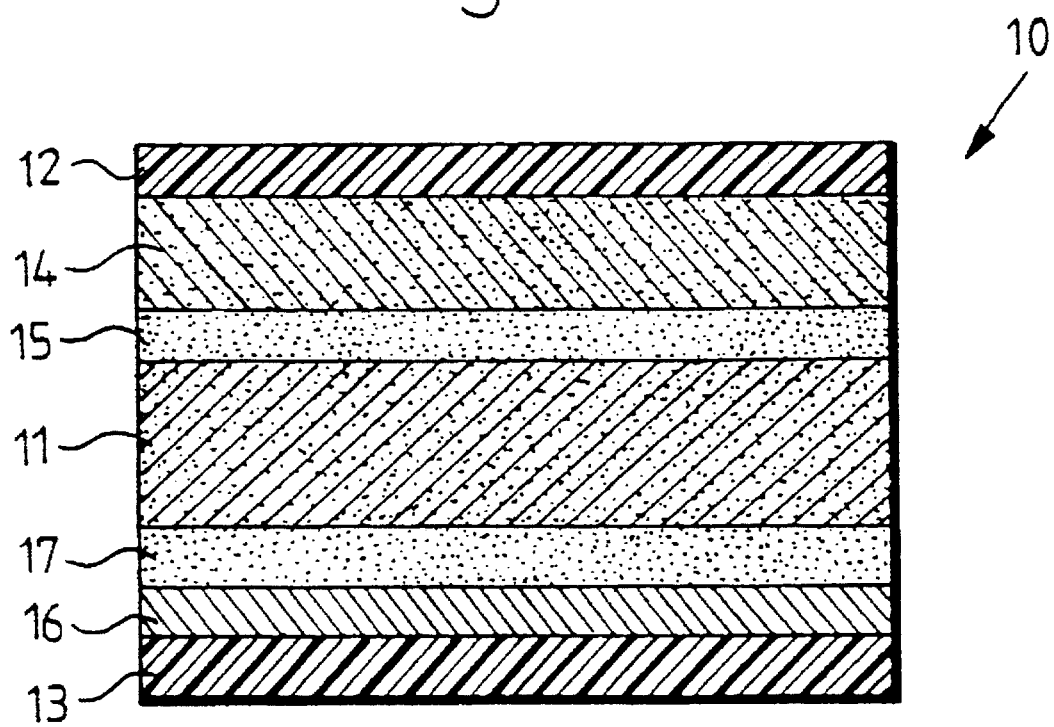

The packaging laminate according to the present invention as shown schematically in FIG. 1 has been given the generic reference numeral 10. The packaging laminate 10 has a rigid, but foldable core layer 11 of paper or paperboard and outer coatings or films 12 and 13 of thermoplastic, preferably polyethylene. Between the core layer 11 and the one outer coating or film 12 of thermoplastic, there is disposed a layer 14 of greaseproof paper which is bonded to the core layer 11 via an interjacent layer 15 of binder or sealant plastic, preferably polyethylene. Between the other outer coating or film 13 of thermoplastic and the core layer 11, there is further provided an aluminum foil 16 which is bonded to the core layer 11 via an interjacent layer 17 of binder or sealant plastic, preferably polyethylene.

The layer of greaseproof paper 14 is preferably opaque or translucent and, as has been mentioned previously, is produced by mechanical refining or extensive grinding of woodpulp fibers in a per se known manner. Furthermore, the greaseproof paper layer 14 can be printed and/or pattern decorated by means of suitable printing ink on its one side, in which event the interjacent layer 15 of binder or sealant plastic may be white pigmented in order to provide a suitable background for the color print of the printed greaseproof paper layer which is thereby clearly manifest through the outer plastic film or the coating 12.

In the illustrated embodiment, the core layer 11 of paper or paperboard provides mechanical strength and stability to the packaging laminate 10, while the layer 14 of greaseproof paper imparts to the laminate good printability and good fat resistance properties. The aluminum foil 16 gives the laminate 10 excellent oxygen gas barrier properties, and the two outer films or coatings 12 and 13 of plastic, preferably polyethylene, make the packaging laminate 10 liquid-tight and sealable by heat sealing.

From a web or a prefabricated blank of the illustrated and described packaging laminate 10, there are produced configurationally stable, liquid-tight packaging containers employing conventional, rational packaging machines of the type which both form, fill and seal the packages.

From, for example a web, such packaging containers can be produced in that the web is reformed into a tube, by both longitudinal edges of the web being permanently united to one another by heat sealing in a longitudinal lap joint or seam. The tube is filled with the desired contents, for example edible oil, and is then divided into closed, cushion-shaped packages by repeated heat sealings of the tube, via transverse sealings along the longitudinal axis of the tube, beneath the level of the contents in the tube. The packages are separated from one another by incisions in the transverse seals and are given the desired geometric, normally parallelepipedic, final form by an additional forming and heat sealing operation.

Such a packaging container containing edible oil gives the packed edible oil the requisite mechanical and chemical product protection to be able to transport and store the edible oil during lengthy periods of time, without the pristine freshness qualities of the edible oil being lost.

Even though the present invention has been described with particular reference to a specific embodiment, it is of course possible without departing from the spirit and scope of the present invention to modify the described embodiment both as regards number and composition of the individual material layers included in the packaging laminate. However, such modifications will be obvious to a person skilled in the art and lie within the the spirit and scope of the present invention as defined in the appended Claims.

What is claimed is:

1. A liquid-tight, configurationally stable packaging container possessing fat resistance properties, which comprises a packaging laminate comprising:

a) a rigid, but foldable, core layer of paper or paperboard;
   b) a layer of greaseproof paper bonded to the core layer via an interposed binder or sealant layer, the layer of greaseproof paper facing outwardly from the interior of the packaging container; and
   c) a layer of aluminum foil disposed on the side of the core layer opposite to the side to which is bonded the layer of greaseproof paper.

2. The packaging container as claimed in claim 1, wherein the greaseproof paper layer is opaque.

3. The packaging container as claimed in claim 1, wherein the greaseproof paper layer is coated with an outer film or coating of thermoplastic.

4. The packaging container as claimed in claim 3, wherein the outer film or coating consists of polyethylene.

5. The packaging container as claimed in claim 1, furthering including an outer film or coating of thermoplastic disposed on the side of the core layer on which the aluminum foil is disposed.

6. The packaging container as claimed in claim 5, wherein said outer film or coating of thermoplastic consists of polyethylene.

7. A liquid-tight configurationally stable packaging container possessing fat resistance properties, which is formed of a packaging laminate having an interior surface exposed to the interior of the container, the laminate comprising a rigid, but foldable, core layer of paper or paperboard and a layer of greaseproof paper bonded to the core layer via an interposed binder or sealant layer, the layer of greaseproof paper being on the side of the core layer that is opposite to the side of the core layer that faces the interior surface, and a layer of metal foil disposed on the side of the core layer opposite to the side to which is bonded the layer of greaseproof paper.

8. The packaging container as claimed in claim 7, wherein the greaseproof layer is opaque.

9. The packaging container as claimed in claim 7, wherein the greaseproof layer is coated with an outer film or coating of thermoplastic.

10. The packaging container as claimed in claim 9, wherein the outer film or coating consists of polyethylene.

11. The packaging container as claimed in claim 7, furthering including an outer film or coating of thermoplastic disposed on the side of the core layer opposite to the side to which is bonded the layer of greaseproof paper.

12. The packaging container as claimed in claim 11, wherein said outer film or coating of thermoplastic consists of polyethylene.

13. A liquid-tight, configurationally stable packaging container possessing superior fat resistance properties, which comprises a packaging container comprising:

a) a rigid, but foldable, core layer of paper or paperboard;
   b) a layer of greaseproof paper bonded to the core layer via an interposed binder or sealant layer, the layer of greaseproof paper facing outwardly from the interior of the packaging container;
   c) a layer of aluminum foil disposed on the side of the core layer opposite to the side to which is bonded the layer of greaseproof paper;
   d) an inner layer of polyethylene over the layer of greaseproof paper; and
   e) an outer layer of polyethylene over the layer of aluminum foil.

14. The packaging container of claim 9, further including an outer film or coating of thermoplastic disposed on the side of the core layer opposite to the side to which is bonded the layer of greaseproof paper.

15. The packaging container of claim 14, wherein said outer film or coating of thermoplastic consists of polyethylene.

* * * * *